F. ENGLAND.
DOOR FOR AUTOMOBILES AND OTHER VEHICLES.
APPLICATION FILED APR. 25, 1911.
1,008,805.
Patented Nov. 14, 1911.
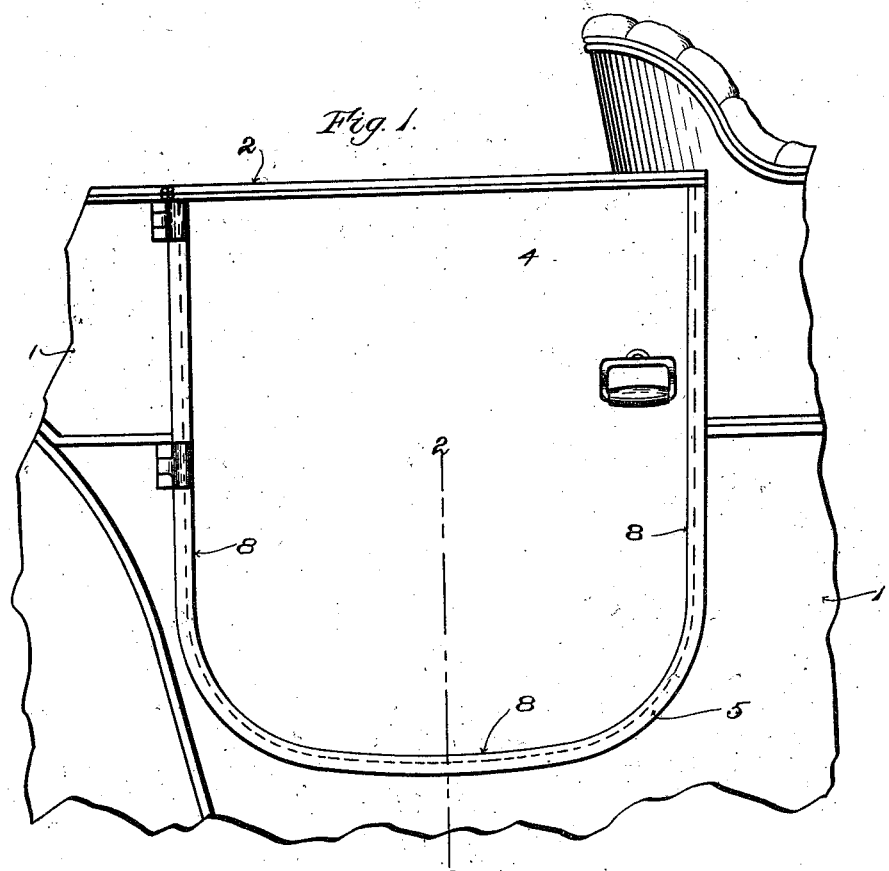
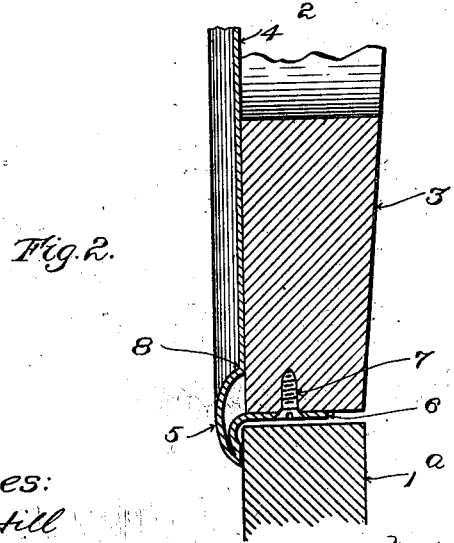
Witnesses:
Oscar F. Hill
Edith A. Vaseman
Inventor:
Fred England
by Chas. F. Randall
Attorney.

UNITED STATES PATENT OFFICE.

FRED ENGLAND, OF AMESBURY, MASSACHUSETTS, ASSIGNOR TO AMESBURY METAL BODY COMPANY, OF AMESBURY, MASSACHUSETTS, A CORPORATION OF MASSACHUSETTS.

DOOR FOR AUTOMOBILES AND OTHER VEHICLES.

1,008,805.  Specification of Letters Patent.  Patented Nov. 14, 1911.

Application filed April 25, 1911. Serial No. 623,310.

*To all whom it may concern:*

Be it known that I, FRED ENGLAND, a citizen of the United States, residing at Amesbury, in the county of Essex, State of Massachusetts, have invented a certain new and useful Improvement in Doors for Automobiles and other Vehicles, of which the following is a specification, reference being had therein to the accompanying drawings.

The invention has been designed more especially for application to doors of automobiles and other vehicles, but is not restricted to application in connection with vehicles.

The invention consists in a metal facing or panel formed with a raised marginal molding having an outwardly-projecting rim-portion constituting a stop-shoulder, and the latter having in continuation thereof an offsetting flange which is attached to the edge of the door.

An embodiment of the invention is shown in the drawings, in which latter,—

Figure 1 represents a portion of an automobile structure, including a door, the said door having the said embodiment of the invention applied thereto. Fig. 2 is a view in vertical section in the plane of dotted line 2, 2, of Fig. 1.

Having reference to the drawings,—the body of the automobile is marked 1, in Fig. 1, and 2 is the door in its entirety.

In Fig. 2, 3 is the frame of the door.

The one-piece combined panel, molding, rim and offsetting flange involving the invention comprises the sheet-portion or "panel" 4, the molding 5, and the flange 6, the said flange being shown only in Fig. 2. The said combined panel, molding, etc., corresponds in contour with the frame 3 of the door, so that the molding 5 follows the edge of the said frame along both of the vertical sides of the latter and also along its bottom, with about one-half of the width of the molding projecting beyond the said edge in the form of a rim which overlies the margin 1ª of the body 1 around the doorway, and the offsetting flange 6 closely conforms to the edge of the frame and fits against such edge. The said flange is engaged by screws, bolts or nuts, one of which is shown at 7, Fig. 2, which pass through the same into the edge of the frame and thereby secure the panel, etc., to the door.

The molding 5 is bent outward from the plane of the panel 4 along the line 8, 8, 8, as shown best in Fig. 2, so as thereby to produce the raised bead-like effect. At the outer margin of the molding the sheet-metal is doubled back upon itself to the extent of about one-half of the width of the molding, and is then bent backward at right angles to the plane of the panel to form the flange 6. The said flange forms a finish for the edge of the door, in addition to receiving the screws which secure it to the edge of the door-frame and thereby attach the combined panel, molding, etc., to the door-frame. The doubled portion which is exterior to the flange 6 constitutes the rim which overlies and closes the crack or opening between the edge of the door and the inclosing door-casing, and constitutes a stop-shoulder that makes contact with the outer surface of the door-casing when the door is closed to. It will be perceived that the described construction, as shown in Fig. 2, produces a strong and stiff projecting rim capable of resisting and withstanding the effects of the door being slammed shut. The flange 6, it will be seen, is so disposed that in consequence of being attached to the edge of the door-frame it reinforces the said rim. Inasmuch as the molding is integral with the panel there is no crack at 8 between the two, requiring to be closed with paint and varnish. A crack at such place is difficult to fill and close, and even when effectually filled with paint at first, some portion of it breaks open sooner or later in consequence of vibration, jars, etc. As soon as the opening begins to present itself, the paint and varnish begin to scale off from the points of contact between the panel and the molding, with resulting injury and unsightliness. With the improved construction herein shown and described, inasmuch as there is no crack, the panel and molding being integral, these undesirable results are obviated.

The form, etc., may be varied without involving departure from the principle of the invention.

What is claimed as the invention is:

1. A metallic panel for vehicle bodies having an edge fashioned with a flange disposed at an angle to the surface of the body of the panel, a projecting portion outside of the panel, the said flange and the body of the panel, and a molding integral with the metal adjacent the said projecting portion.

2. A metallic panel for vehicle bodies having an edge fashioned with a flange disposed at an angle to the surface of the body of the panel, and an integral molding between the flange and the body of the panel, the edge of the molding projecting beyond the flange and body of the panel.

3. In a door for automobiles and other vehicles, the combination with the door-frame, of the one-piece sheet-metal, combined panel 4, molding 5, rim, and offsetting flange 6, the said flange fitting the edge of the door-frame and attached thereto, and the said molding and rim projecting beyond the flange and formed by bending the sheet-metal back upon itself at the outer edge of the molding and constituting a stop-shoulder which engages with the edge of the adjacent portion of the door-casing.

In testimony whereof I affix my signature in presence of two witnesses.

FRED ENGLAND.

Witnesses:
JAMES H. HASSETT,
CHARLES E. PARKMAN.